United States Patent
Cho (10) Patent No.: US 6,859,614 B1
(45) Date of Patent: *Feb. 22, 2005

(54) APPARATUS AND METHOD FOR CONTROLLING PRIORITY ORDER OF ACCESS TO MEMORY

(75) Inventor: Chan-Dong Cho, Kyungki-do (KR)

(73) Assignee: Samsung Electronics Co., Ltd., Suwon-si (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 512 days.

(21) Appl. No.: 08/881,123

(22) Filed: Jun. 24, 1997

(30) Foreign Application Priority Data

Jun. 24, 1996 (KR) .............................. 96-23340

(51) Int. Cl.$^7$ .................... H04N 5/926; H04N 7/52
(52) U.S. Cl. .................. 386/124; 386/46; 386/126
(58) Field of Search .................... 386/45, 46, 125, 386/126, 124; 348/7, 10, 13, 12; 711/151, 158, 106; 725/111, 121, 131

(56) References Cited

U.S. PATENT DOCUMENTS

| | | | | |
|---|---|---|---|---|
| 5,016,273 A | * | 5/1991 | Hoff ............................ | 386/46 |
| 5,303,218 A | * | 4/1994 | Miyake ...................... | 386/125 |
| 5,438,666 A | * | 8/1995 | Craft et al. ................. | 711/106 |
| 5,848,367 A | * | 12/1998 | Lotocky et al. .............. | 348/12 |
| 5,883,901 A | * | 3/1999 | Chiu et al. ................... | 348/10 |

FOREIGN PATENT DOCUMENTS

| | | |
|---|---|---|
| JP | 58-203563 | 11/1983 |
| JP | 61-70650 | 4/1986 |
| JP | 63-116260 | 5/1988 |
| JP | 3-2949 | 1/1991 |
| JP | 3-105660 | 5/1991 |
| JP | 4-24843 | 1/1992 |
| JP | 4-30238 | 2/1992 |
| JP | 4-38552 | 2/1992 |
| JP | 4-284550 | 10/1992 |
| JP | 5-134980 | 6/1993 |
| JP | 5-151147 | 6/1993 |
| JP | 5-197675 | 8/1993 |
| JP | 8-77691 | 3/1996 |

* cited by examiner

*Primary Examiner*—Thai Tran
*Assistant Examiner*—Christopher Onuaku
(74) *Attorney, Agent, or Firm*—Staas & Halsey, LLP (57) ABSTRACT

An apparatus for controlling an access to a memory in a system decoder of a digital video disk player. The digital video disk player includes several devices which access the memory. A memory controller connected to the devices and a data/address bus controls access to the memory. A priority order controller allows the devices to access the memory according to a predetermined priority order. The priority order controller generates acknowledgement signals to the corresponding devices in response to request signals generated from the devices. If two or more request signals are simultaneously generated from the devices, the priority order controller generates an acknowledgement signal to the appropriate device according to a predetermined priority order of the devices. Further, the acknowledgement signal is deactivated, if an access actuation signal is deactivated.

20 Claims, 7 Drawing Sheets

APPARATUS AND METHOD FOR CONTROLLING PRIORITY ORDER OF ACCESS TO MEMORY

BACKGROUND OF THE INVENTION

1. Field of the Invention

The present invention relates to a system decoder in an optical disk reproducing device, and more particularly, to an apparatus and method for controlling a priority order of access to a memory in a digital video (or versatile) disk device.

2. Description of the Related Art

A digital video disk, as a recording medium for a digital moving picture, is an inexpensive multimedia recording medium capable of recording high quality video/audio data. Such a digital video disk can record over two hours of MPEG2 (Moving Picture Experts Group 2) digital image data.

Figure 1:
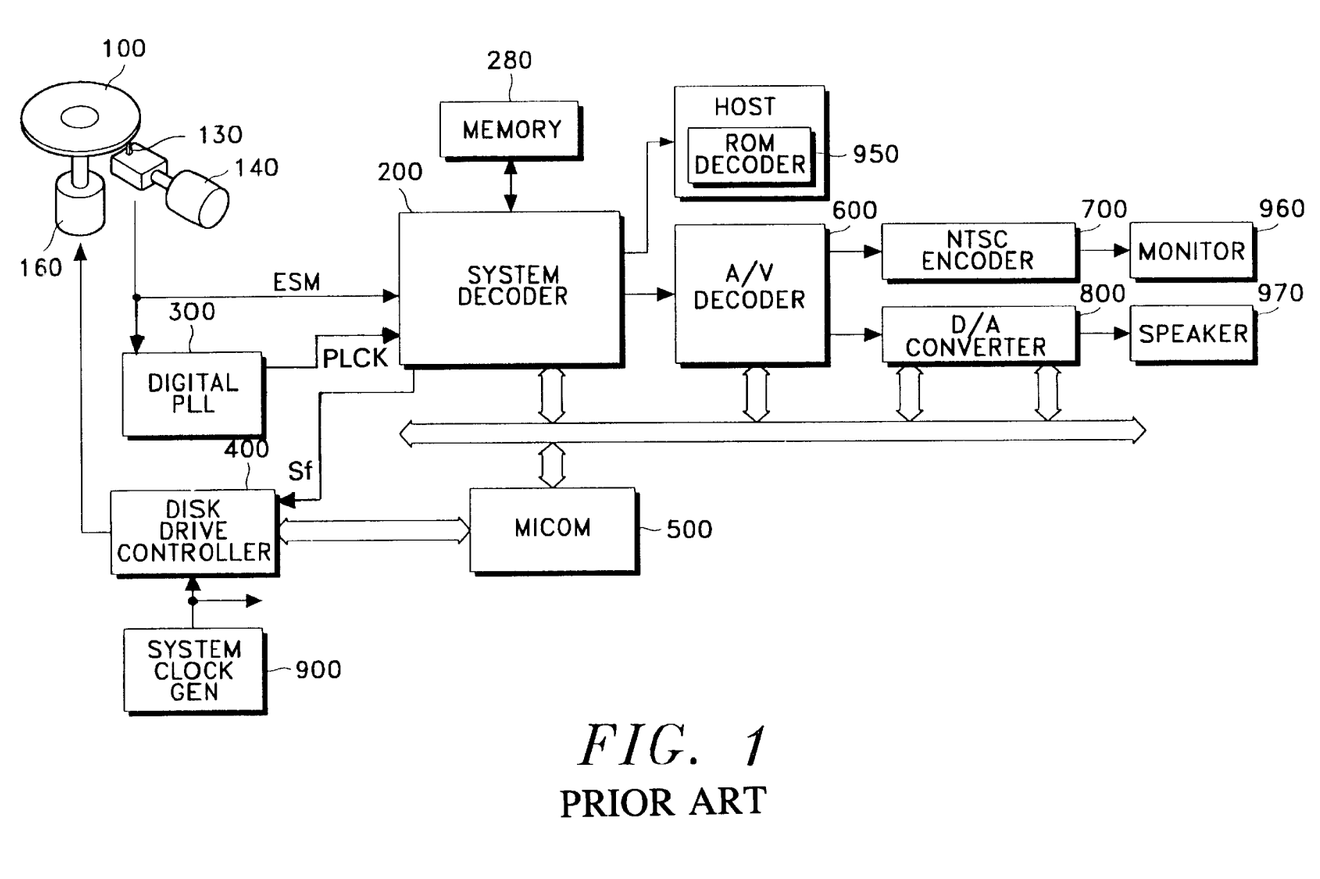
FIG. 1 is a schematic block diagram of a known digital video disk player.

FIG. 1 shows a known general digital video disk (DVD) reproducing device (also referred to as a "DVD player", a "DVD reader" or simply a "DVD apparatus"). The DVD player is provided with a disk motor 160 which rotates a disk 100 at a constant linear velocity. An optical pickup 140, with a head 130, reads a digital image signal on the disk 100 and converts the digital image signal into an analog high frequency (RF) signal. The converted analog signal compensates the feature of RF frequency input through a radio frequency equalizer RF EQ and is reshaped into a pulse to generate ESM (Eight-to-Sixteen Modulation) data of a data stream via an ESM slicer 135. The ESM data is applied to a system decoder 200 and a digital phase locked loop (hereinafter referred to as "PLL") 300, to generate a first clock phase locked with a signal reproduced from the disk 100, thereby generating a clock PLCK capable of reading the ESM data in the system decoder 200. The system decoder 200 performs demodulation, error correction and descrambling operations with respect to the ESM data, and detects a frame synchronous signal Sf which is applied to a disk drive controller 400. A memory 280, including first and second memory regions (not shown), temporarily stores the data generated from the system decoder 200 during the above stated operations. The memory 280 is typically a DRAM (Dynamic Random Access Memory).

A microcomputer 500 controls an overall operation of the DVD player, and generates a transfer control signal in response to a data transfer start signal from the audio/video decoder 600 or a ROM decoder 950.

The digital PLL 300 includes a phase comparator, a voltage controlled oscillator and a frequency demultiplier (all not shown), to generate the first clock phase-locked with the signal reproduced from the disk 100, thereby generating a clock PLCK capable of reading the ESM data in the system decoder. The disk drive controller 400 maintains the constant linear velocity of the disk revolution and performs other disk operations according to the frame synchronous signal Sf supplied from a synchronization detector (not shown) in the system decoder 200 and a clock signal supplied from a system clock generator 900, using a frequency servo and a phase servo (not shown). The system clock generator 900 generates the clocks needed by the system decoder 200.

The audio/video decoder 600 divides the data output from the system decoder 200 into audio data and video data. The demodulated audio and video data output from the audio/video decoder 600 are transferred to a speaker 970 and a monitor 960, respectively, via a digital-to-analog converter 800 and an NTSC encoder 700.

The ROM (Read Only Memory) decoder 950 is commonly supplied in a host (e.g., a personal computer) and operates according to a control of the host. The ROM decoder 950 transfers data generated from the system decoder 200 to the host based on a predetermined interfacing method.

Figure 2:
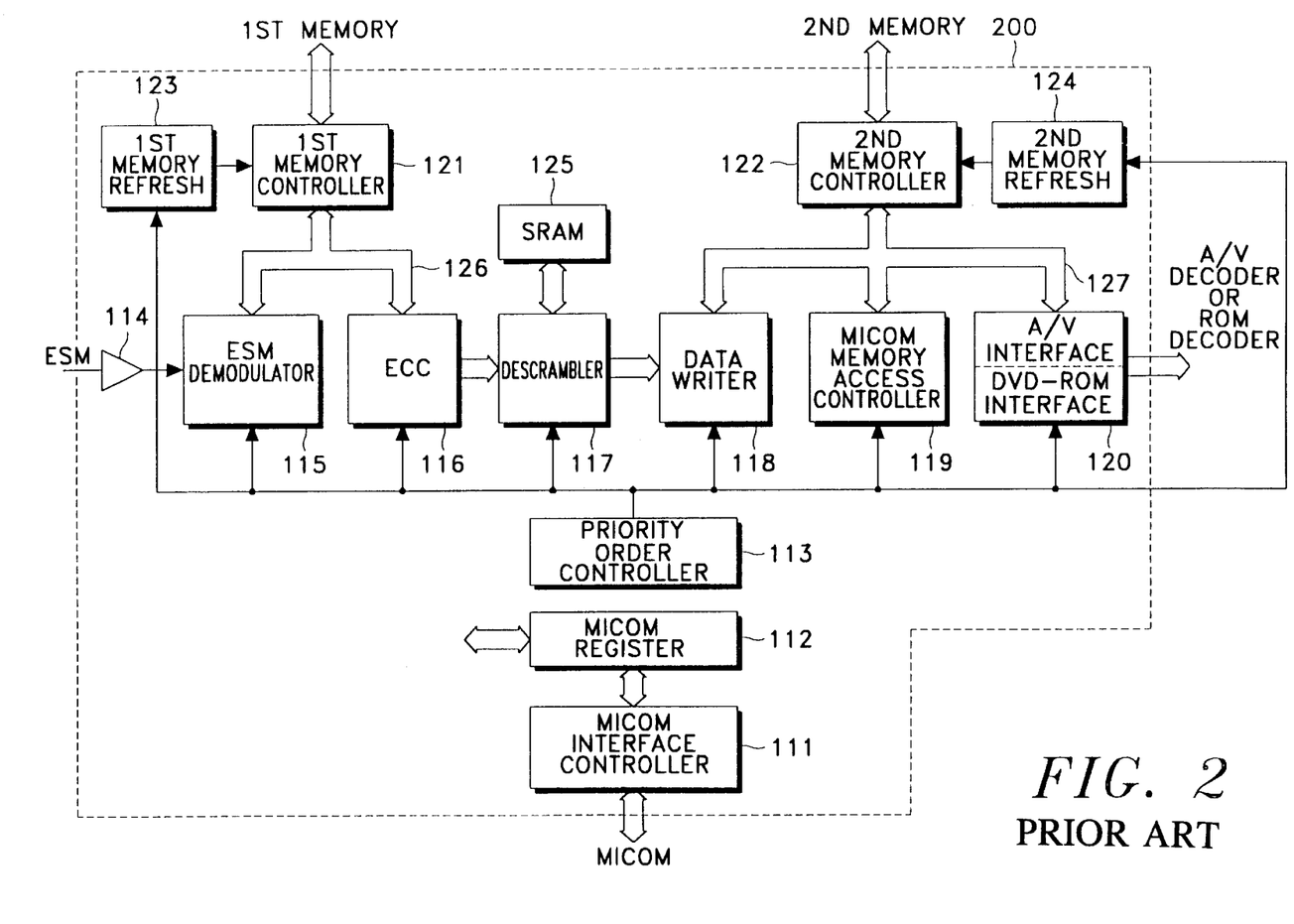
FIG. 2 is a schematic block diagram of a known system decoder in the digital video disk player shown in FIG. 1.

FIG. 2, is a detailed block diagram of the system decoder 200 of the known DVD player shown in FIG. 1. The ESM data read from the digital video disk 100 is applied to the system decoder 200. The ESM data is first amplified by an amplifier 114. An ESM demodulator 115, connected to a first data bus 126, demodulates the data output by the amplifier 114. An ECC (error correction circuit) 116 connected to the first data bus 126 corrects any errors in the demodulated data output by the ESM demodulator 115. The data output from the ESM demodulator 115 and the ECC 116 are stored into a first memory (not shown) via a first memory controller 121 connected to the first data bus 126. When it is required to read or write data through access of the first memory in the ESM demodulator 115 or the error correction circuit 116, the memory controller 121 generates a control signal capable of smoothly accessing the first memory as required. Because the memory access is randomly required in the above ESM demodulator 115 or the error correction circuit 116, the memory controller 121 controls timing crash therein. A first memory refresh circuit 123, connected to the first memory controller 121, refreshes the first memory.

A descrambler 117 descrambles the error corrected data output from the ECC 116. An internal SRAM (Static Random Access Memory) 125 temporarily stores the descrambled data of the descrambler 117. A data writer 118 connected to a second data bus 127 stores the data output from the descrambler 117 into a second memory (not shown). A microcomputer memory access controller 119 connected to the second data bus 127 controls the microcomputer 500 (see FIG. 1) to access the second memory. An A/V decoder interface and DVD-ROM interface 120 connected to the second data bus 127 transmits the descrambled data stored in the second memory to the audio/video decoder 600 and/or the ROM decoder 950.

A second memory controller 122 connected to the second data bus 127 controls the data writer 118, the microcomputer memory access controller 119, and the A/V decoder interface and DVD-ROM interface 120 makes access to the second memory. A second memory refresh circuit 124 connected to the second memory controller 122 refreshes the second memory. A microcomputer interface controller 111 forms an interfacing between the microcomputer 500 (see FIG. 1) and the system decoder 200. A microcomputer register 112 connected to the first and second data buses 126 and 127 receives data output from the microcomputer interface controller 111 to store control signals for controlling each device 115–125 of the system decoder 200, and temporarily stores state information generated from each of the above stated devices to provide the microcomputer 500 with the state information. A priority order controller 113 controls a priority order of access to the first memory, the second memory and the SRAM 125 in response to access request signals respectively from the first memory refresh circuit 123, the ESM demodulator 115, the error correction circuit 116, the descrambler 117, the data writer 118, the microcomputer memory access controller 119, the A/V decoder interface and DVD-ROM interface 120, and the second memory refresh circuit 124.

As can be appreciated from the above descriptions, the prior art system decoder 200 includes three memories (i.e., the first and second memories, and the internal SRAM 125) for storing data from each device 115–125, thereby resulting in an increase of size and higher manufacturing costs. Therefore, a reduction in the number of memories is needed to improve the operation of the priority order controller 113 and the DVD player as a whole.

SUMMARY OF THE INVENTION

It is therefore an object of the present invention to provide an apparatus and method for controlling a priority order of access to a memory, in which the apparatus includes only one memory and an access to the memory is controlled in accordance with a predetermined priority order.

According to an aspect of the present invention, an apparatus for controlling an access to a memory in a system decoder includes a plurality of devices accessing a common memory, a memory controller connected to the memory and connected to the devices via a data/address bus so as to control an access to the memory, and a priority order controller for allowing the devices access to the memory according to a predetermined priority order. The priority order controller generates acknowledgement signals to the corresponding devices in response to request signals generated respectively from the devices. If two or more request signals are simultaneously generated from the devices, the priority order controller generates acknowledgement signals to the corresponding devices according to a predetermined priority order of the devices. Further, the acknowledgement signals are deactivated, if an access actuation signal is deactivated.

According to another aspect of the present invention, a method for controlling an access to a memory in an apparatus including a plurality of devices, a memory for storing data generated during operations of the devices and for storing operation data for the devices, a memory controller connected to the memory and connected to the devices via a data/address bus so as to control an access to the memory, and a priority order controller connected to the devices so as to control an access to the memory, includes the steps of: generating a request signal for requesting an access to the memory, so as to allow the devices to make an access to the memory; generating an acknowledgement signal to the device corresponding to the request signal, generating acknowledgement signals to the corresponding devices according to a predetermined priority order if two or more request signals are simultaneously generated; forming a communication path to the data/address bus in response to the acknowledgement signal to make an access to the memory; generating an access actuation signal during an access to the memory; activating the acknowledgement signal if the access actuation signal is activated, and deactivating the acknowledgement signal if the access actuation signal is deactivated.

BRIEF DESCRIPTION OF THE DRAWINGS

The above and other objects, features and advantages of the present invention will become more apparent in light of the following detailed description of an exemplary embodiment thereof taken with the attached drawings in which.

DETAILED DESCRIPTION OF THE PREFERRED EMBODIMENT

A preferred embodiment of the present invention will be described in detail hereinbelow with reference to the attached drawings, in which like reference numerals represent like elements. Further, it should be clearly understood by those skilled in the art that many specifics such as the detailed circuit elements are shown only by way of an example so as to allow a better understanding of the present invention. The present invention may be embodied without reference to these specifics.

Figure 3:
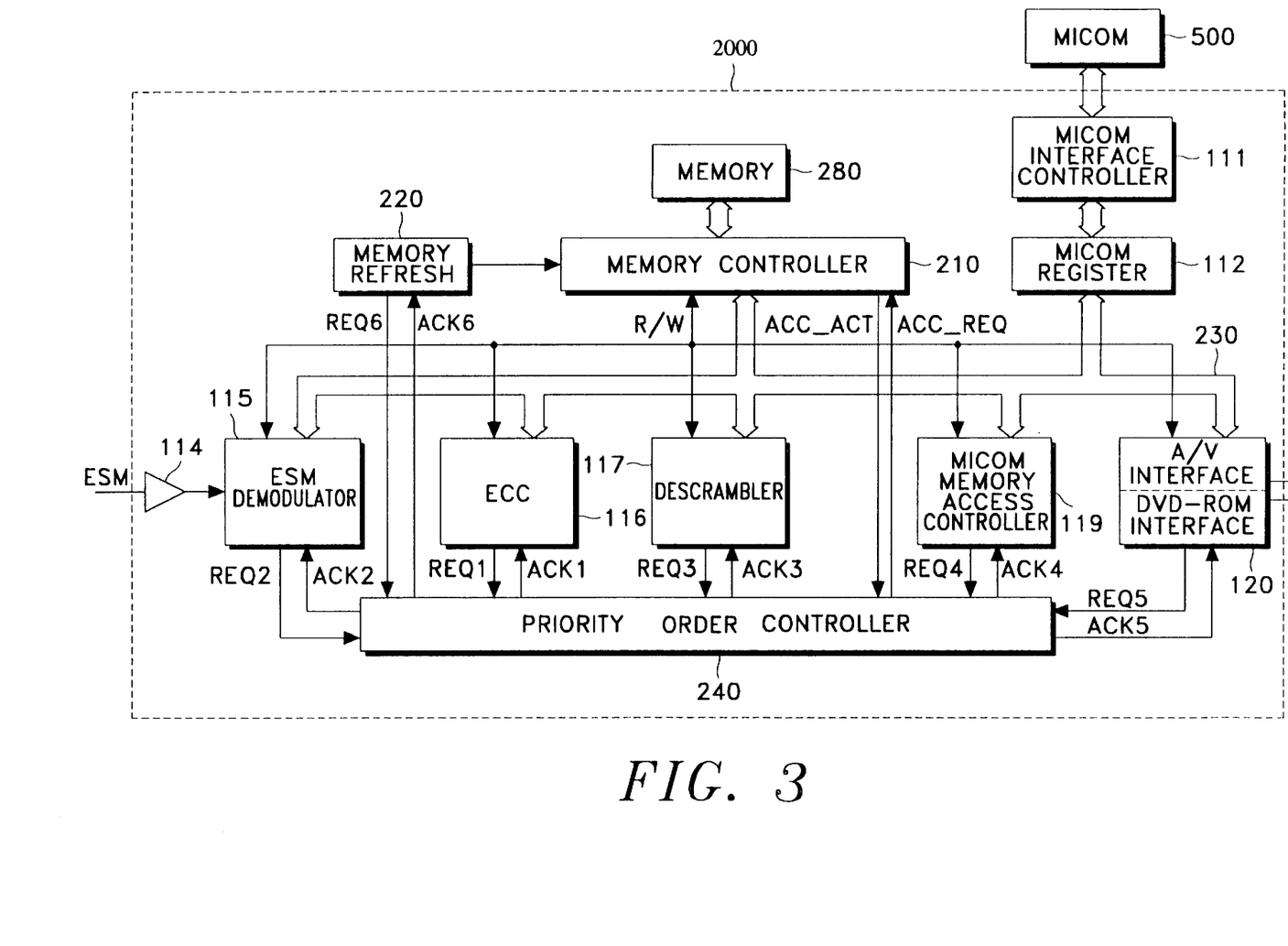
FIG. 3 is a block diagram of a system decoder for a digital video disk player according to an embodiment of the present invention.

FIG. 3 is a block diagram of a system decoder 2000 according to an embodiment of the present invention. The system decoder 2000 includes a single memory 280, which preferably comprises a DRAM. A microcomputer interface controller 111 interfaces between a microcomputer 500 and the system decoder 2000. The microcomputer 500 controls an overall operation of a digital video disk player including the operation of the system decoder 2000.

In general, as in the known DVD player, described hereinabove, a disk motor 160 (see FIG. 1) rotates a DVD (digital video disk) 100 (see FIG. 1) at a constant linear velocity, with respect to a head 130 (see FIG. 1), to reproduce an image recorded on the disk 100. An optical pickup 140 (see FIG. 1) with the head 130 reads digital image data on the DVD 100 and converts the digital image data into an analog high frequency (RF) signal. The converted analog signal compensates the feature of RF frequency input through a radio frequency equalizer RF EQ and is reshaped into a pulse to generate ESM data via an ESM slicer (not shown).

The ESM data stream is amplified by an amplifier 114 and transferred to an ESM demodulator 115. The ESM demodulator 115 demodulates the ESM data by a symbol unit of a predetermined bit number. In other words, the ESM demodulator 115 applies the ESM data to a 32-bit shift register (not shown). The lower (or upper) 16 bits of the 32-bit output from the 32-bit shift register is selectively transferred to a sixteen-to-eight demodulator (not shown; hereinafter, referred to as 16-8 demodulator). The 16-8 demodulator converts the 16-bit data input into 8-bit data which constitutes the symbol. This operation is performed, because, typically, the data underwent an eight-to-sixteen (8-16) modulation when it was written on the DVD 100. Further, the ESM demodulator 115 generates a second request signal REQ2 having a second priority order, when requesting an access to the memory 280 to read or write data from/to the memory 280. The ESM demodulator 115 forms a communication path via a data bus (or data/address bus) 230, in response to a second acknowledgement signal ACK2 applied thereto, so as to make an access to the memory 280.

An ECC (error correction circuit) 116 corrects errors in the row and column directions, with respect to a predetermined error correction block, in the data read from the DVD 100. During this operation, the memory 280 receives ID (Identification) data and main data generated by the ESM demodulator 115 via the data bus 230 and a memory controller 210, and stores those data in block units. The ID data refer to a physical address of the disk and the main data refer to compressed data including an error correction code, that is, audio or video data to be finally reproduced. Specifically, the memory controller 210 addresses the memory 280 under the control of the microcomputer 500 and stores corresponding demodulated data into the memory 280, forming an error correction block which consists of data for 16 sectors. The memory 280 also buffers the data while error corrections are performed in the row and column directions, and stores the error corrected data. The ECC 116 generates a first request signal REQ1, having a top priority order, to request access to the memory 280. The ECC 116 forms a communication path with the data bus 230 in response to a first acknowledgement signal ACK1, to access the memory 280.

A descrambler 117 receives data corresponding only to the main data out of the error corrected data stored in the memory 280 and compensates for a time delay due to the descrambling, to restore to the original data. The descrambler 117 generates a third request signal REQ3, having a third priority order to request an access to the memory 280. The descrambler 117 forms a communication path with the data bus 230, in response to a third acknowledgement signal ACK3, to access the memory 280.

A microcomputer memory access controller 119 generates a fourth request signal REQ4, having a fourth priority order, in response to an access request control signal from the microcomputer 500, to allow the microcomputer 500 to access the memory 280. Upon receiving a fourth acknowledgement signal ACK4, the microcomputer memory access controller 119 forms a communication path with the data bus 230 to access the memory 280.

An A/V decoder interface and DVD-ROM interface 120 transfers the descrambled data selectively to an A/V decoder and/or a ROM decoder according to the type of data stored on the DVD 100. The A/V decoder interface and DVD-ROM interface 120 generates a fifth request signal REQ5, having a fifth priority order, to request an access to the memory 280. The A/V decoder interface and DVD-ROM interface 120 forms a communication path with the data bus 230, in response to a fifth acknowledgement signal ACK5, to access the memory 280.

A memory refresh circuit 220 refreshes the memory 280 to prevent data loss in the memory 280. The memory refresh circuit 220 generates a sixth request signal REQ6, having a sixth priority order, to request access to the memory 280. The memory refresh circuit 220 forms a communication path with the data bus 230, in response to a sixth acknowledgement signal ACK6, to access the memory 280.

A priority order controller 240 generates the first to sixth acknowledgement signals ACK1–ACK6 in response to the first to sixth request signals REQ1–REQ6. Where two or more request signals REQ1–REQ6 are applied simultaneously, the priority order controller 240 generates the acknowledgement signals ACK1–ACK6 according to a priority order. Upon receiving any one of the request signals REQ1–REQ6, the priority order controller 240 also generates an access request signal ACC_REQ to the memory controller 210, to allow access to the memory 280.

The memory controller 210 controls generation of row and column address signals and the prevention of memory overflow and underflow under the control of the microcomputer 500. Namely, the memory controller 210 stores the data read from the DVD 100 into the memory 280, reads the data from the memory 280, by a predetermined block unit, to provide the read data to the ECC 116, stores the error corrected data back into a corresponding region of the memory 280, and stores the data restored during descrambling and deinterleaving into the memory 280 or reads data stored previously into the memory 280. Further, upon receiving the access request signal ACC_REQ, the memory controller 210 makes an access to a corresponding address of the memory 280 in response to a read/write signal R/W generated from the data bus 230. The memory controller 210 generates an access actuation signal ACC_ACT during an access to the memory 280, and stops generating the access actuation signal ACC_ACT when the access operation is completed.

A microcomputer register 112 receives data output from the microcomputer 500 to store various control signals for controlling each part of the system decoder 2000, and stores state 9' information generated from each part of the system decoder 2000 to provide the microcomputer 500 with the state information.

The microcomputer interface controller 111 interfaces with the microcomputer 500 to read and write data from/to the microcomputer register 112 and the memory 280.

Figure 4:
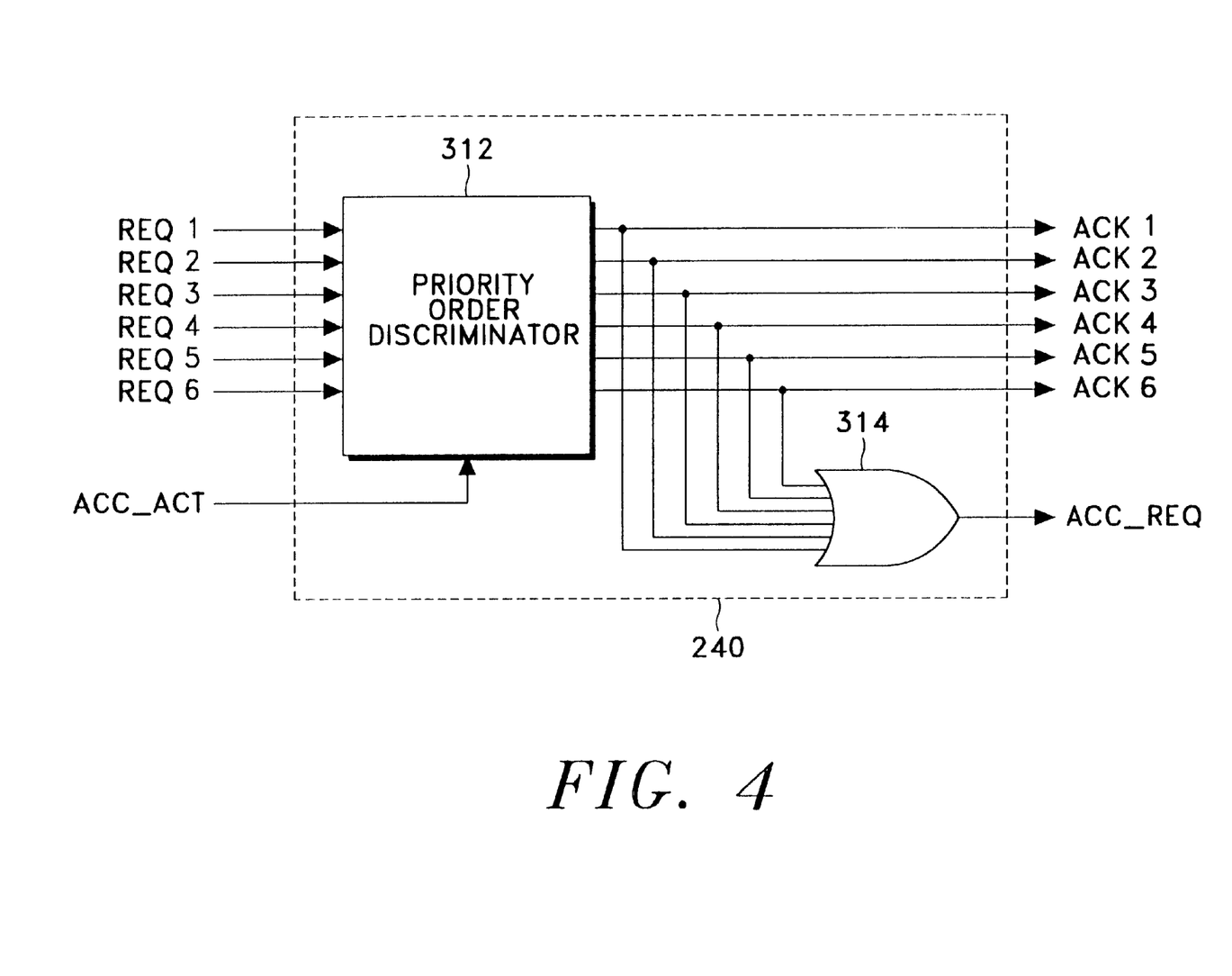
FIG. 4 is a block diagram of a priority order controller for the digital video disk player shown in FIG. 3.

FIG. 4 is a block diagram of the priority order controller 240 as shown in FIG. 3. The priority order controller 240 generally comprises a priority order discriminator 312 which receives the first to sixth request signals REQ1–REQ6 from the respective devices 115, 116, 117, 119, 120, and 220, and generates the first to sixth acknowledgement signals ACK1–ACK6, based on the priority order, to the corresponding devices 115, 116, 117, 119, 120, and 220, respectively. The devices 115, 116, 117, 119, 120, and 220 form communication paths with the data bus 230 in response to the first to sixth acknowledgement signals ACK1–ACK6 so as to access the memory 280. Then, the memory controller 210 controls the respective devices 115, 116, 117, 119, 120, and 220 to access the memory 280 using a predetermined address.

An OR gate 314 connected to the priority order discriminator 312 receives the first to sixth acknowledgement signals ACK1–ACK6 to generate the access request signal ACC_REQ to the memory controller 210. Namely, the access request signal ACC_REQ is a signal for informing the memory controller 210 that one of the devices 115, 116, 117, 119, 120, and 220 requests an access to the memory 280. While the access actuation signal ACC_ACT, generated from the memory controller 210, is activated, i.e., has a logic high state, the priority order discriminator 312 stops generating the acknowledgement signals ACK1–ACK6 in response to the request signals REQ1–REQ6.

Figure 5:
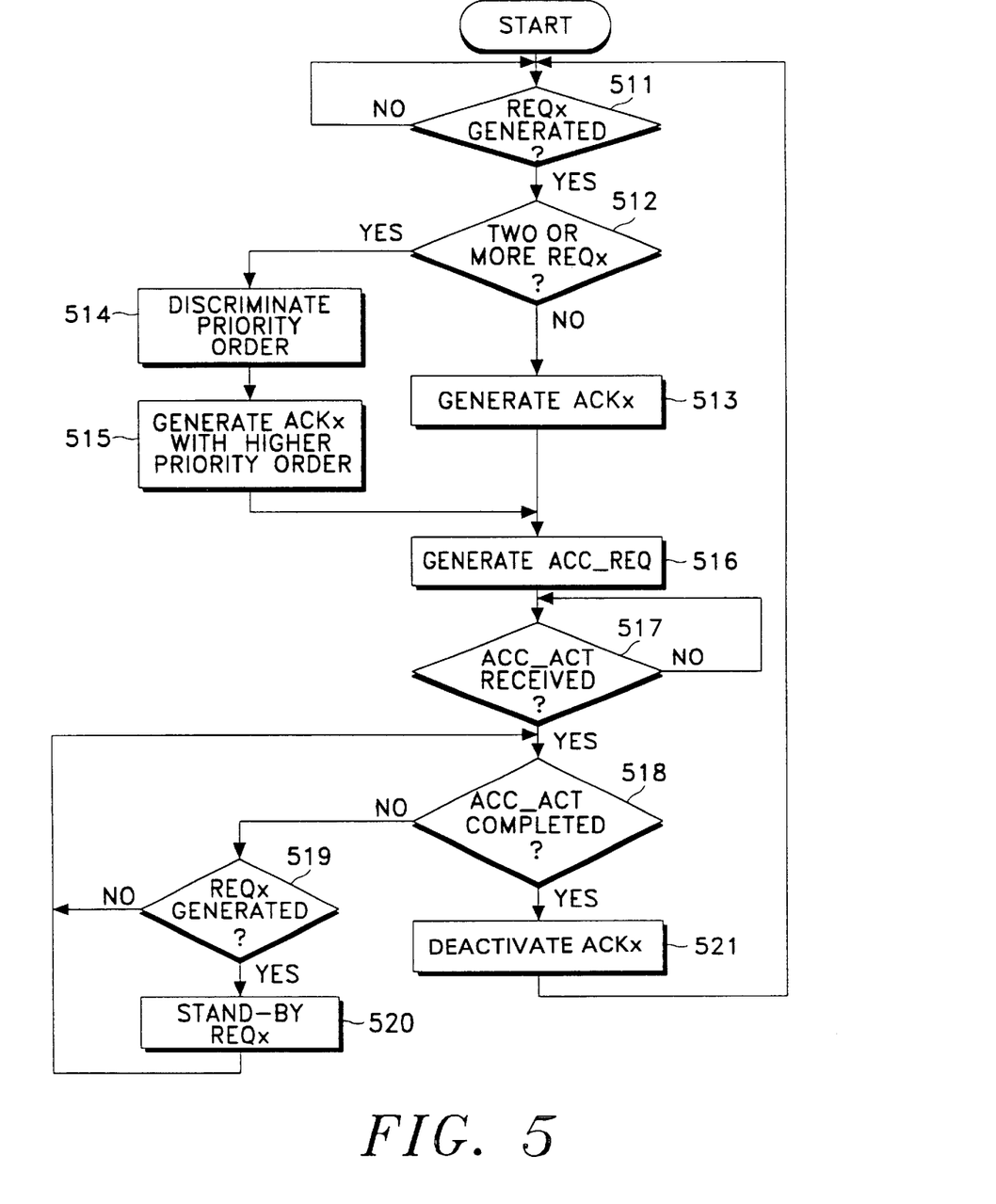
FIG. 5 is a flow chart showing the operation of the priority order controller shown in FIG. 3.

FIG. 5 is a flow chart for explaining the operation of the priority order controller 240 shown in FIG. 3. First, it is checked, at a step 511, whether the priority order controller 240 has received a request signal REQx (where x=1-6). If the request signal REQx has been received, the priority order discriminator 312 checks, at a step 512, whether two or more request signals REQx are being generated. If only one request signal REQx is being generated, the priority order discriminator 312 generates the acknowledgement signal ACKx (where x=1-6) to the corresponding device, at a step 513. If, however, two or more request signals REQx are being generated at step 512, the priority order discriminator 312 discriminates the priority order of the request signals REQx at a step 514. Thereafter, the acknowledgement signal ACKx of the corresponding device with the higher priority order is generated at a step 515.

While the priority order discriminator 312 generates the acknowledgement signal ACKx, the OR gate 314 generates the access request signal ACC_REQ, and transmits the same to the memory controller 210, at a step 516. Thereafter, the priority order discriminator 312 checks, at a step 517, whether the access request signal ACC_REQ is received. If the access request signal ACC_REQ is received, the priority order discriminator 312 checks, at a step 518, whether generation of the access actuation signal ACC_ACT is completed. If the access actuation signal ACC_ACT is currently being generated, the priority order discriminator 312 checks, at a step 519, whether an additional request signal REQx is being generated. If an additional request signal REQx is generated while the access actuation signal ACC_ACT is being generated, the priority order discriminator 312 keeps the request signal REQx in a stand-by state at a step 520. In either event, a return is made to step 518 to check again whether generation of the access actuation signal ACC_ACT has been completed. Once generation of the access actuation signal ACC_ACT is completed, the priority order discriminator 312 deactivates the acknowledgement signal ACKx at a step 521, and returns to the step 511 to process the request signal REQx that has been held in the stand-by state at the step 520, or awaits a new REQX.

Figure 6:
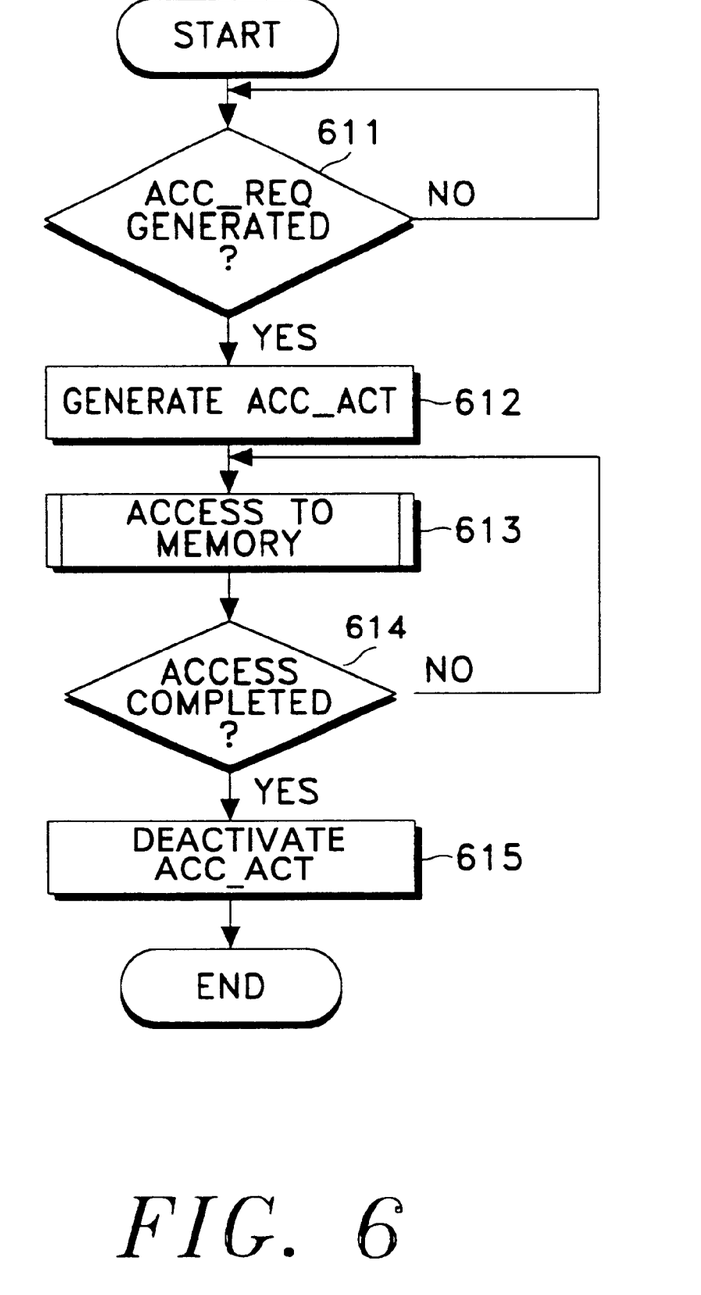
FIG. 6 is a flow chart showing the operation of a memory controller shown in FIG. 3.

FIG. 6 is a flow chart for explaining the operation of the memory controller 210 shown in FIG. 3. The memory controller 210 waits at step 611, for an access request signal ACC_REQ to be generated from the priority order controller 240. If the access request signal ACC_REQ is generated, the memory controller 210 generates an access actuation signal ACC_ACT at a step 612. Thereafter, the memory controller 210 forms a communication path with the data bus 230 at a step 613, to allow the corresponding device to make an access to the memory 280. In this way, the devices 115, 116, 117, 119, 120, and 220 may make an access to the memory 280. Subsequently, the memory controller 210 checks, at a step 614, whether the corresponding device has completed its access to the memory 280. If the device has completed its access to the memory 280, the memory controller 210 deactivates the access actuation signal ACC_ACT at a step 615, and otherwise, a return is made to step 613.

Figures 7A, 7B, 7C, 7D, 7E, 7F:
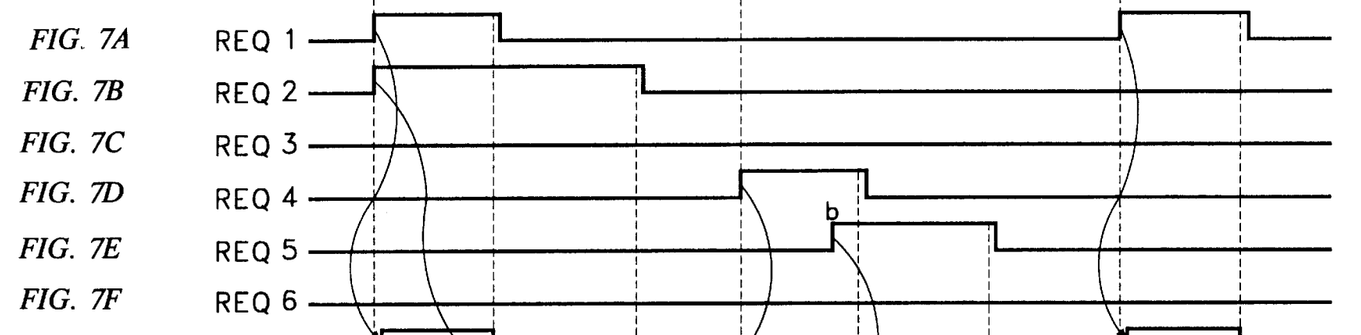
FIGS. 7A through 7N are timing diagrams of various control signals in a digital video disk player in accordance with the embodiment of the present invention.
Figures 7G, 7H, 7I, 7J, 7K, 7L, 7M, 7N:
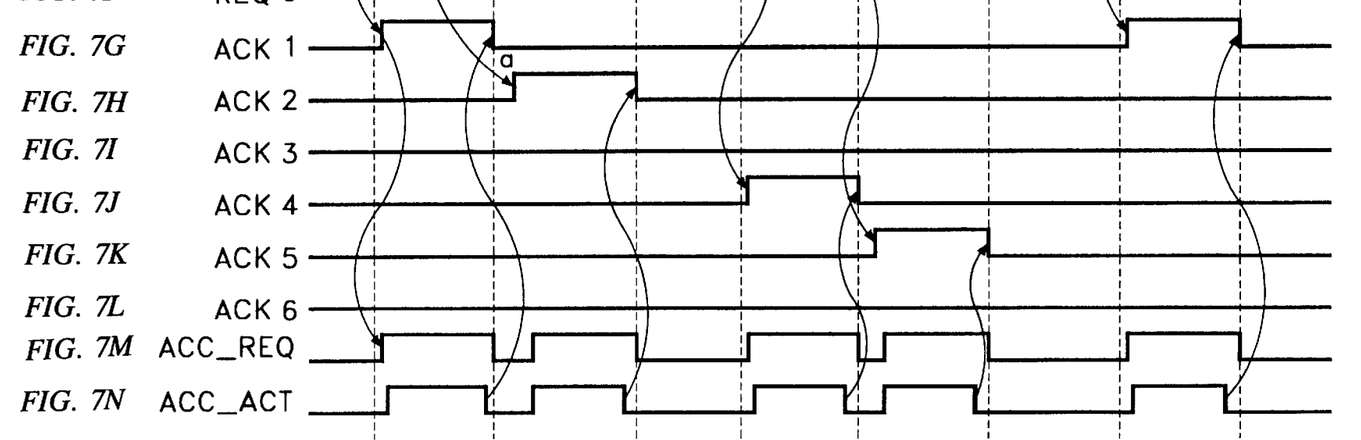

FIGS. 7A through 7N are timing diagrams of various control signals used in the system decoder 2000, in accordance with the embodiment of the present invention. In FIGS. 7A through 7N, the logic high level represents the activation level. If the first and second request signals REQ1 and REQ2 are generated simultaneously at a time T1, the priority order discriminator 312 discriminates the priority order of the request signals REQ1 and REQ2, and generates the first acknowledgement signal ACK1 to the appropriate device (i.e., error correction circuit 116) corresponding to the first request signal REQ1 (see the steps 512–515 of FIG. 5). Upon receiving the first acknowledgement signal ACK1, the OR gate 314 of the priority order controller 240 generates the access request signal ACC_REQ to the memory controller 210. After awhile, the priority order discriminator 312 receives the access actuation signal ACC_ACT from the memory controller 210. Upon completion of an access to the memory 280, the access actuation signal ACC_ACT is deactivated to the logic low state. Then, the priority order discriminator 312 deactivates the first acknowledgement signal ACK1 to the logic low state. As the result of an deactivation of the first acknowledgement signal ACK1, the access request signal ACC_REQ is deactivated to the logic low state and the first request signal REQ1 is also deactivated to the logic low state. Thereafter, the second acknowledgement signal ACK2 corresponding to the second request signal REQ2 being in the stand-by state is activated to the logic high state at a time "a" to allow the corresponding device (ESM demodulator 115) to make an access to the memory 280. Similarly, after awhile, the access actuation signal ACC_ACT is deactivated to the logic low state, and second acknowledgement signal ACK2 is deactivated to the logic low state.

If the fourth request signal REQ4 is generated at a time T2, the priority order discriminator 312 generates the fourth acknowledgement signal ACK4, to allow the corresponding device (microcomputer memory access controller 119) to make an access to the memory 280. After awhile, if the fifth request signal REQ5 is generated at a time "b", the priority order discriminator 312 maintains the fifth request signal REQ5 in the stand-by state. When the access actuation signal ACC_ACT is deactivated to the logic low state causing the fourth acknowledgement signal ACK4 to be deactivated to the logic low state, the priority order discriminator 312 activates the fifth acknowledgement signal ACK5 to the logic high state to allow the corresponding device (A/V decoder interface and DVD-ROM interface 120) to make an access to the memory 280 (see the steps 518–521 of FIG. 5).

As described in the foregoing, the system decoder 2000 according to the present invention includes only one memory 280 which is accessible according to a predetermined priority order, so that the circuit structure may become simplified and the manufacturing cost may be reduced.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims. For example, the present invention may be employed to any apparatus including a plurality of devices commonly accessing a memory. Additionally, the priority for each of the devices taught herein was described by way of example only, and one of ordinary skill in the art will recognize that various other priority levels may be assigned to each device.

What is claimed is:

1. An apparatus having a memory controller for controlling access to a memory by a plurality of devices, the apparatus comprising:
   a priority order controller
      to generate either
         an acknowledgement signal to a corresponding one of the plurality of devices in response to a request signal generated by the corresponding device, or
         the acknowledgement signal to the corresponding device according to a predetermined priority order if more than one request signal is simultaneously generated from the plurality of devices, and
      to subsequently deactivate the generated acknowledgement signal if an access actuation signal is deactivated,
   wherein the access actuation signal is distinct from the request signal and is issued by the memory controller to indicate that one of the plurality of devices is accessing the memory.

2. The apparatus of claim 1, wherein said priority order controller, when the access actuation signal is no longer being issued, further transmits a next acknowledgement signal relating to another request signal that both correspond to another one of the devices and was generated while the access activation signal was issued.

3. An apparatus for controlling access to a memory comprising:

a plurality of devices which access the memory, each of said plurality of devices generating a corresponding request signal to request access to the memory and forming a communication path to a data/address bus in response to a corresponding acknowledgement signal;

a memory controller, connected between the memory and said plurality of devices, to control communication between the memory and said plurality of devices in response to an access request signal, said memory controller to generate an access actuation signal during access by one of said plurality of devices; and a priority order controller
to generate acknowledgment signals to corresponding ones of the devices in response to request signals from the corresponding ones of the devices,
to generate the acknowledgement signal to the corresponding one of the devices according to a predetermined priority order of the devices if greater than one request signal is simultaneously generated by said plurality of devices,
to generate and transmit the access request signal to said memory controller in response to the generation of the corresponding acknowledgement signal, and
if the request signal is generated during generation of the access actuation signal, to transmit a next acknowledgement signal relating to the request signal generated during generation of the access actuation signal to a corresponding one of the devices when the access actuation signal is no longer being generated,
where the access actuation signal is distinct from the request signal.

4. A digital video disk apparatus comprising:
a microcomputer to control the apparatus;
a memory to store data;
a disk revolution controller to rotate a digital video disk according to a control signal of said microcomputer;
a data/address bus;
a demodulator connected to said data/address bus for demodulating data read from the digital video disk, said demodulator to generate a second request signal for requesting access to said memory and forming a communication path with said memory in response to a second acknowledgement signal;
an error correction circuit connected to said data/address bus for correcting errors in the demodulated data output from said demodulator, said error correction circuit to generate a first request signal for requesting access to said memory and to form a communication path with said memory in response to a first acknowledgement signal;
a descrambler connected to said data/address bus to descramble the error corrected data output from said error correction circuit, said descrambler to generate a third request signal for requesting access to said memory and to form a communication path with said memory in response to a third acknowledgement signal;
a microcomputer memory access controller connected to said data/address bus for allowing said microcomputer to access said memory, said microcomputer memory access controller to generate a fourth request signal for requesting access to said memory and to form a communication path with said memory in response to a fourth acknowledgement signal;
an interface connected to said data/address bus to transfer the descrambled data output from said descrambler to at least one of an audio/video decoder and a host in response to a control signal from said microcomputer, said interface to generate a fifth request signal for requesting access to said memory and to form a communication path to said memory in response to a fifth acknowledgement signal;
a memory refresh circuit connected to said data/address bus to refresh said memory, said memory refresh circuit to generate a sixth request signal for requesting access to said memory and forming a communication path to said memory in response to a sixth acknowledgement signal;
a memory controller connected between said memory and said data/address bus, to control communication with said memory via the data/address bus in response to an access request signal, and generating an access actuation signal during access of said memory; and
a priority order controller to generate the first to sixth acknowledgement signals in accordance with a sequence of the first to sixth request signals, said priority order controller to generate the first to sixth acknowledgement signals according to a predetermined priority order if more than one of the first to sixth request signals are simultaneously generated, said priority order controller to generate the access request signal while generating each of the first to sixth acknowledgement signals, wherein the one of the first through sixth request signal received during generation of the access actuation signal is maintained in a stand-by state and the acknowledgement signal corresponding to the one request signal received during generation of the access actuation signal is generated after completion of the access actuation signal.

5. The digital video disk apparatus according to claim 4, wherein the predetermined priority order is determined according to a sequence of the first to sixth request signals.

6. A method for controlling access of a plurality of devices to a memory, comprising:
generating an individual acknowledgement signal in response to a request signal from one of the devices;
generating the individual acknowledgement signal for the appropriate one of the devices according to a predetermined priority order of the devices when more than one request signal is simultaneously generated by the devices;
generating an access actuation signal that is distinct from the request signal and indicates that one of the plurality of devices is accessing the memory;
deactivating the access actuation signal after the one device has finished accessing the memory; and
deactivating the acknowledgement signal after the access actuation signal is deactivated.

7. A method for controlling access of a plurality of devices to a memory, comprising:
generating a request signal for each device which is requesting access to the memory;
generating an acknowledgement signal to one device corresponding to a request signal, the one device being selected according to a predetermined priority order;

forming a communication path between the one device and the memory via a data/address bus in response to the acknowledgement signal to allow the one device access to the memory;

generating an access actuation signal that is distinct from the request signal during access by the one device to the memory;

activating an acknowledgement signal while the access actuation sign al is activated, and deactivating the acknowledgement signal when the access actuation signal is deactivated.

8. The method of claim 7, further comprising receiving another request signal from another device which is requesting access to the memory while the access actuation signal is activated; and generating a next acknowledgement signal relating to the another request signal when the access actuation signal is no longer being generated.

9. The method of claim 8, wherein said generating the next acknowledgement signal comprises generating the next acknowledgement signal according to the predetermined order of the devices if multiple requests are received while the access actuation signal was actuated.

10. An apparatus comprising:

a memory accessible by a single device at a time;

a plurality of devices which access said memory;

a memory controller that generates an access actuation signal to indicate that one of said plurality of devices is accessing said memory; and a priority order discriminator which receives a request from each device requesting access to said memory, said priority order discriminator outputting an acknowledgement signal to one of said plurality of devices indicating that the one device may access said memory, the one device being selected based on a predetermined priority order among said plurality of devices, wherein the one device forms a communication path with said memory and accesses said memory when the one device receives the acknowledgement signal, and said priority order discriminator deactivates the acknowledgement signal upon the deactivation of the access actuation signal, and the access actuation signal is distinct from the request.

11. An apparatus, according to claim 10, further comprising:

a bus connecting each of said plurality of devices to said memory; and a plurality of communication paths connecting said priority order discriminator to each of said plurality of devices and said memory.

12. An apparatus, according to claim 11, wherein said memory comprises:

a storage area for storing data;

wherein said apparatus further comprises a memory controller connected to said storage area and said bus for allowing access to said storage area by said plurality devices, said memory controller outputting an access signal, via a communication path, to said priority order discriminator indicating that said memory is being accessed.

13. An apparatus, according to claim 12, wherein while said priority order discriminator receives the access signal from said memory controller any additional requests from the devices for access to the memory are held in a stand-by state.

14. The apparatus of claim 13, wherein said priority order discriminator further receives another request signal from another of said plurality of devices while the access actuation signal is generated, and transmits a next acknowledgement signal relating to the another request signal when the access actuation signal is deactivated.

15. An apparatus, according to claim 11, wherein said priority order discriminator selects the single device based on an order of priority of the communication path to which said device is connected.

16. An apparatus, according to claim 11, further comprising:

a logic circuit which outputs a request signal to said memory controller, via a communication path, while said priority order discriminator is outputting an acknowledgement signal to indicate to said memory that a device will be making access to said memory.

17. The apparatus of claim 10, wherein said priority order discriminator further receives another request signal from another of said plurality of devices while the access actuation signal is generated, and transmits a next acknowledgement signal relating to the another request signal when the access actuation signal is deactivated.

18. An apparatus for controlling access to a memory by a plurality of devices, the apparatus comprising:

a memory controller to issue an access actuation signal, wherein the access actuation signal is issued to indicate that one of the plurality of devices is accessing the memory; and a priority order controller to generate an acknowledgement signal to a corresponding one of the plurality of devices in response to a request signal generated by the corresponding device, to generate the acknowledgement signal to the corresponding device according to a predetermined priority order if more than one of the plurality of devices simultaneously accesses the memory, and to subsequently deactivate the generated acknowledgement signal if the access actuation signal is deactivated, wherein the access actuation signal is distinct from the request signal.

19. An apparatus for controlling access to a memory comprising:

a plurality of devices which access the memory, each of said plurality of devices generating a corresponding request signal for requesting access to the memory and forming a communication path to a data/address bus in response to a corresponding acknowledgement signal;

a memory controller, connected between the memory and said plurality of devices, to control communication between the memory and said plurality of devices in response to an access request signal, said memory controller to generate an access actuation signal distinct from the request signal during access by one of said plurality of devices; and a priority order controller to generate acknowledgement signals to corresponding ones of the devices in response to request signals from the corresponding ones of the devices, to generate the acknowledgement signal to the corresponding one of the devices according to a predetermined priority order of the devices if greater than one of said plurality of devices simultaneously requests access to the memory, to generate and transmit the access request signal to said memory controller in response to the generation of the corresponding acknowledgement signal, and if the request signal is generated during generation of the access actuation signal, to transmit a next acknowledgement signal relating to the request signal generated during generation of the access actuation signal to a corresponding one of the devices when the access actuation signal is no longer being generated.

20. The apparatus of claim 19, wherein said priority order controller transmits the next acknowledgement signal according to the predetermined order of the devices.

* * * * *

UNITED STATES PATENT AND TRADEMARK OFFICE
CERTIFICATE OF CORRECTION

PATENT NO. : 6,859,614 B1  
DATED : February 22, 2005  
INVENTOR(S) : Chan-Dong Cho Page 1 of 1

It is certified that error appears in the above-identified patent and that said Letters Patent is hereby corrected as shown below:

Column 11,
Line 9, change "sign al" to -- signal --;
Line 56, delete "apparatus further comprises a";
Line 57, after "troller" insert -- is -- and delete "for";
Line 58, change "allowing" to -- to allow -- and after "plurality" insert -- of --;
Line 59, change "an" to -- the --; and
Line 60, before "signal" insert -- actuation --.

Signed and Sealed this

Fourth Day of April, 2006

JON W. DUDAS
*Director of the United States Patent and Trademark Office*